(12) United States Patent
Clifford

(10) Patent No.: US 9,002,592 B2
(45) Date of Patent: Apr. 7, 2015

(54) MACHINE WITH GROUND WORKING ELEMENTS PROVIDING IMPROVED STABILITY

(75) Inventor: Christian Dean Clifford, Ipswich (GB)

(73) Assignee: Ransomes Jacobsen Limited (GB)

( * ) Notice: Subject to any disclaimer, the term of this patent is extended or adjusted under 35 U.S.C. 154(b) by 257 days.

(21) Appl. No.: 13/576,909

(22) PCT Filed: Feb. 4, 2011

(86) PCT No.: PCT/GB2011/050199
§ 371 (c)(1),
(2), (4) Date: Aug. 22, 2012

(87) PCT Pub. No.: WO2011/095822
PCT Pub. Date: Aug. 11, 2011

(65) Prior Publication Data
US 2012/0323454 A1 Dec. 20, 2012

(30) Foreign Application Priority Data
Feb. 5, 2010 (GB) .................................. 1001902.4

(51) Int. Cl.
*G06F 7/70* (2006.01)
*A01D 75/28* (2006.01)
*A01D 34/86* (2006.01)

(52) U.S. Cl.
CPC ............... *A01D 75/28* (2013.01); *A01D 34/86* (2013.01)

(58) Field of Classification Search
CPC ... A01D 34/86; A01D 75/28; A01D 2101/00; B60W 2550/142

USPC .......................... 701/50, 70–71; 56/17.1–17.2
See application file for complete search history.

(56) References Cited

U.S. PATENT DOCUMENTS

| 3,876,012 | A | 4/1975 | Regier |
| 4,869,054 | A | 9/1989 | Hostetler et al. |
| 5,203,149 | A | 4/1993 | Youngberg et al. |
| 5,711,139 | A | 1/1998 | Swanson |
| 2005/0108999 | A1 | 5/2005 | Bucher |
| 2009/0178381 | A1* | 7/2009 | Gilles .............................. 56/15.2 |
| 2009/0192691 | A1* | 7/2009 | O'Connor et al. ............... 701/90 |
| 2011/0150615 | A1* | 6/2011 | Ishii .............................. 414/687 |

FOREIGN PATENT DOCUMENTS

| CN | 101350137 A | 1/2009 |
| CN | 201248261 Y | 6/2009 |
| GB | 2330757 A | 5/1999 |
| GB | 2346790 A | 8/2000 |
| JP | 04173003 A | 6/1992 |
| JP | 08289604 A | 11/1996 |
| NL | 7902576 A | 7/1979 |
| WO | WO 2009087795 A1 * | 7/2009 |

OTHER PUBLICATIONS

Chinese First Office Action dated Apr. 3, 2014.

* cited by examiner

*Primary Examiner* — Helal A Algahaim
*Assistant Examiner* — Nga X Nguyen
(74) *Attorney, Agent, or Firm* — Polster Lieder

(57) ABSTRACT

A grass cutting machine with two cutting units mounted on opposite sides of the chassis has an inclinometer monitoring the left/right inclination of the chassis. If the inclination value exceeds a defined threshold, the higher of the two cutting units is lifted to improve stability.

13 Claims, 3 Drawing Sheets

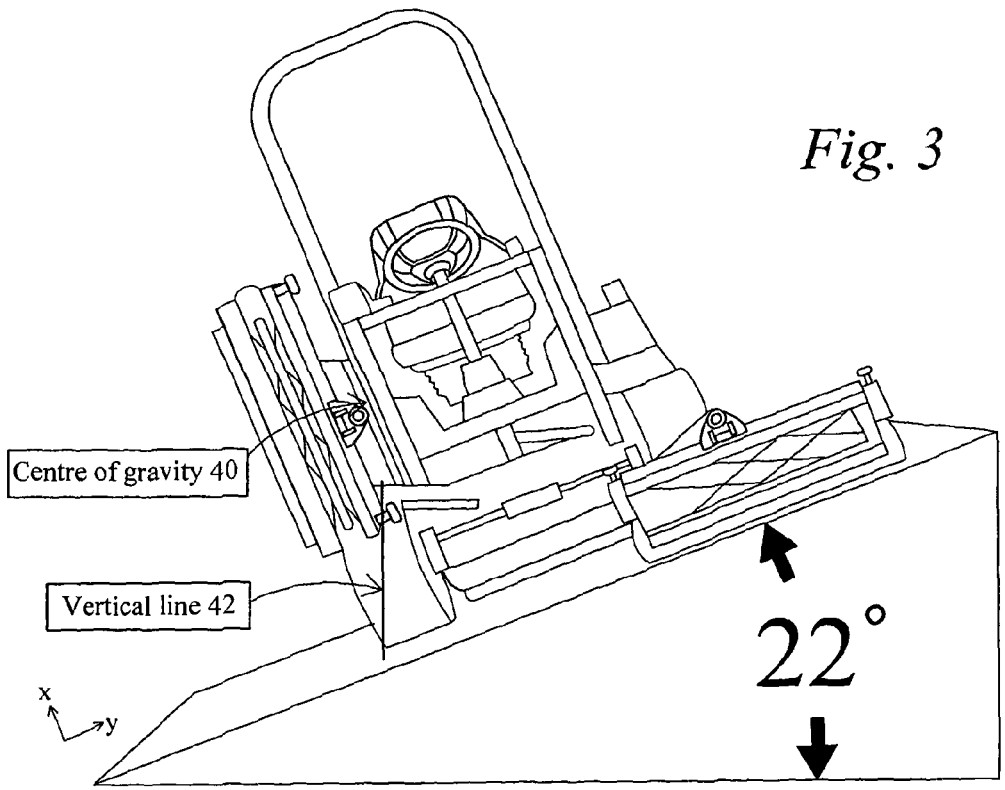
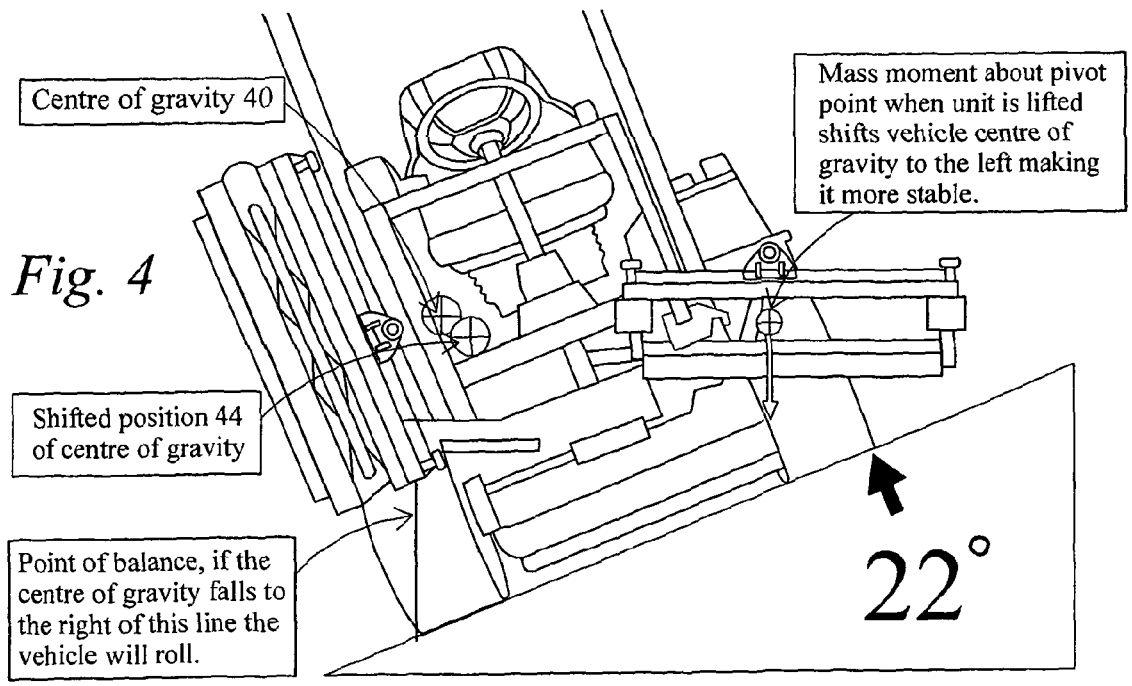

MACHINE WITH GROUND WORKING ELEMENTS PROVIDING IMPROVED STABILITY

CROSS-REFERENCE TO RELATED APPLICATIONS

This application is a National Stage of International Application No. PCT/GB2011/050199, filed Feb. 4, 2011, and published in English as WO 2011/095822 A1 on Aug. 11, 2011. This application claims the benefit and priority of Great Britain Application No. 1001902.4, filed Feb. 5, 2010. The entire disclosures of the above applications are incorporated herein by reference.

BACKGROUND OF THE INVENTION

This invention relates to cutting machines such as grass cutting machines for sports or municipal usage. A typical ride-on grass cutting machine for such usage has multiple grass cutting units which may take the form, for example, of cutter reels or rotating cutters. There will typically be a centrally disposed cutting unit with left and right hand cutting units (or pairs of cutting units) mounted laterally so as to cut contiguous or slightly overlapping swathes as the machine is driven forward over the ground. Often, the left and right cutting units are liftable with respect to the chassis from a grass cutting position to a transport position in which the overall width of the machine is reduced.

In many cases, each cutting unit will incorporate a roller or other ground engaging element which serves in the cutting position to orientate the cutting blade or blades with respect to the ground so as to give the desired height of cut.

In many municipal areas and in some sports, it is a requirement to cut grass on ground that has substantial undulations. It is recognised that for the safety of the ride-on operator—and persons nearby—great care must be taken in design and in operation of the machine to ensure stability over the undulating ground.

It has been proposed on certain grass cutting machines and other utility vehicles to install an inclinometer and to provide a warning as a measured incline approaches a pre-set threshold or thresholds. It is recognised however that through inattentiveness—or because of competing demands—an operator may ignore warnings given to him.

Advantage is seen in providing an improved machine and method of operation in which steps are taken under certain conditions to improve the stability of the machine without reliance being placed on operator action.

BRIEF SUMMARY OF THE INVENTION

According to one aspect of present invention there is provided a machine comprising: a chassis having ground engaging wheels; at least two ground working units mounted on the chassis at locations spaced in a first direction, each working unit having a ground engaging element and being liftable with respect to the chassis from a working position in which the respective ground engaging element is in ground contact; an inclinometer adapted to monitor an inclination of the chassis in the first direction with respect to the horizontal; and a controller adapted to receive an inclination value from the inclinometer and configured when the inclination value exceeds a defined threshold to lift that one of the working units that is by virtue of the inclination at a higher level than the other of the working units.

The controller may be configured to lifting a working unit from a working position in which a substantial proportion of the weight of the working unit is borne by the ground, to a lifted position in which a substantial proportion of the weight of the working unit is borne by the chassis.

It will thus be seen that embodiments of the invention can react to a measured inclination—without reliance upon operator involvement—to lift some but not all working units in a manner predetermined to improve the stability of the machine.

Grass cutting units are often carried on lift arms, with the lift arm being rotatable from a grass cutting position, in which the cutting unit is horizontal, to a transport position in which the cutting unit is vertical. The transport position will typically reduce the overall width of the machine for transport along roads or through gateways. The present inventors have recognised that the stability of the machine on a left to right incline (that is to say in the direction in which the left and right hand cutting units are separated) can be improved by lifting the higher of the two cutting units to a stability lift position. The moment exerted on the chassis by the lifted unit, in the rotational sense which improves stability, is greater in the stability lift position than in either of the working or transport positions. This is because, in the working position, the weight or a substantial proportion of the weight of the cutting unit is borne on the ground. Taking into account geometrical considerations, lifting to the stability lift position may involve rotating the lift arm through that minimum angle that can be assumed to (or be determined to) transfer substantially all of the weight of the unit from the ground to the chassis. Rotation beyond that minimum angle may of course unhelpfully reduce the moment applied.

The chassis may be adapted to be driven in a forward direction with said first direction being transverse to the forward direction. Whilst the typical situation will have differential lifting of left and right hand units (together with lifting or not of a central unit), situations may arise where differential lifting of forward and backward units can improve stability in the front and back direction. A practical situation may require an optimal strategy to be selected in accordance with a measured left to right incline and a measured fore and aft incline.

Each working unit may be mounted on a lift arm extending in the first direction, the lift arm being rotatable with respect to the chassis about an axis extending in the forward direction. Preferably, the lift arm is rotatable with respect to the chassis from a working position in which the working unit is essentially horizontal to a transport position in which the working unit is essentially vertical, the controller being configured when the inclination value exceeds a defined threshold to rotate the lift arm of that one of the working units to a stability lift position intermediate the working and transport positions. Advantageously, the moment exerted on the chassis by the working unit is greater in the stability lift position than in the transport position.

The working units will typically comprise grass cutting units, each grass cutting unit suitably comprising a driven cutter reel cooperating with a fixed blade.

Usefully, the defined threshold can be set in the range of 60% to 90% or preferably in the range of 70% to 80% of the measured stability angle, being the maximum inclination of the chassis in the first direction with respect to the horizontal at which the machine remains stable.

In another aspect the present invention consists in a method of operating a machine comprising a chassis having ground engaging wheels; at least two ground working units mounted on the chassis at locations spaced in a first direction, and being liftable with respect to the chassis from a working position; the method comprising the steps of measuring an inclination of the chassis in the first direction with respect to the horizontal; and in dependence upon the measured inclination initiating differential lifting of the working units so as to increase a moment exerted on the chassis by a working unit in a rotational sense which improves the stability of the chassis with regard to the inclination.

The step of differential lifting the working units may comprises lifting a working unit from a working position in which a substantial proportion of the weight of the working unit is borne by the ground, to a stability lift position in which a substantial proportion of the weight of the working unit is borne by the chassis.

Where the working unit is further liftable from the stability lift position to a transport position, the stability lift position may be selected such that the moment exerted on the chassis by the working unit is greater in the stability lift position than in the transport position.

The measured inclination may be compared with one or more predetermined inclination thresholds with distinct visual or audible warnings being optionally provided at each threshold.

BRIEF DESCRIPTION OF THE DRAWINGS

The present invention will now be described by way of example with reference to the accompanying drawings in which:—

FIG. 3 is a pictorial view of the machine on inclined ground.

FIG. 4 is a view similar to FIG. 3 but illustrating operation of an example of the invention.

DETAILED DESCRIPTION OF EMBODIMENTS OF THE INVENTION

Figure 1:
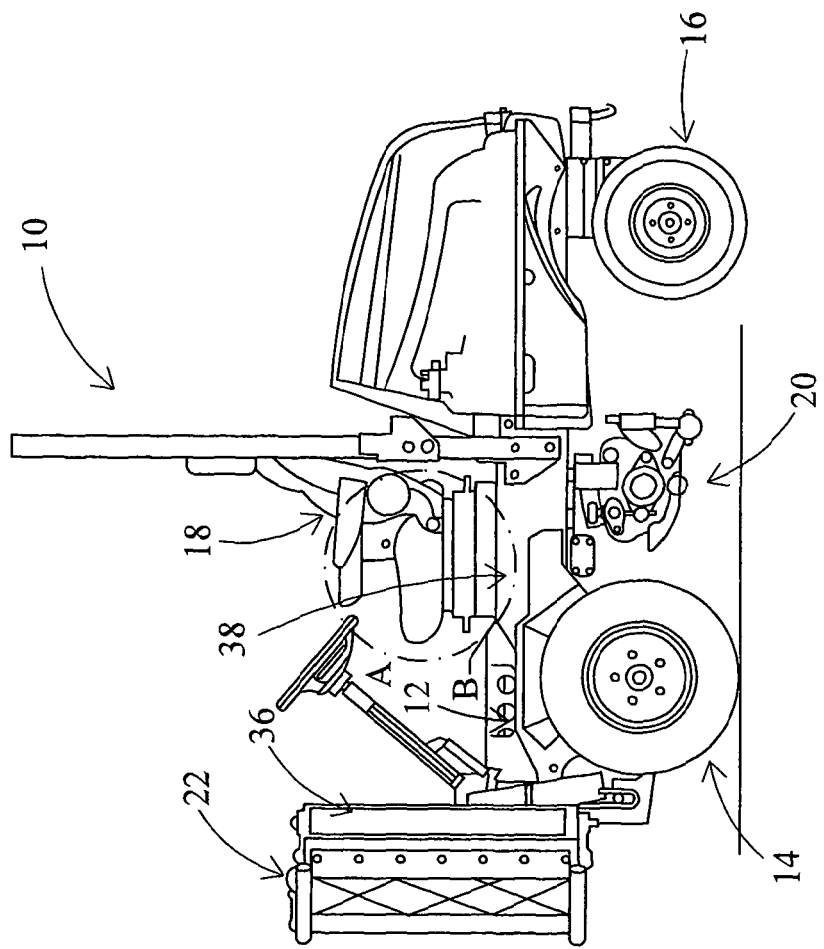
FIG. 1 is a side view of a grass cutting machine.

The grass cutting machine shown in the drawings is of generally conventional construction and the physical layout of the working parts of the machine need not be described in detail.

The grass cutting machine shown at (10) comprises a chassis (12) supported on forward (14) and rear (16) wheels. An operator seat unit (18) is provided on the chassis.

The machine carries three reel cutting units: a central cutting unit (20) hung beneath the chassis and two front cutting units (left 22 and right 24, as seen by the operator) disposed forwardly of the front wheels (14). Each front cutting unit (22,24) is mounted on a lift arm (26). At the inward end, each lift arm is mounted on the chassis for rotation about a horizontal axis (28) oriented fore and aft of the machine.

At the outward end, the lift arm supports the cutting unit through a sleeve (30), the arrangement providing relative rotation of the outward end of the lifting arm and the cutting reel about an axis (32) parallel to the axis (28).

A hydraulic ram (not shown) is connected with each lift arm (26) via a lug (34). Thus, introduction of hydraulic fluid into the ram will affect rotation of the lifting arm about the axis (28) to lift the associated cutting unit. It will be seen that each cutting unit contains a ground roller (36). This extends parallel to the axis of the cutting reel and is positioned so that in the cutting orientation, engagement of the roller with the ground serves to control the height of cut. In this cutting orientation, the cutter unit floats with respect to the chassis with relative rotation about the parallel axes (28) (32) serving to accommodate ground contours.

Figure 2:
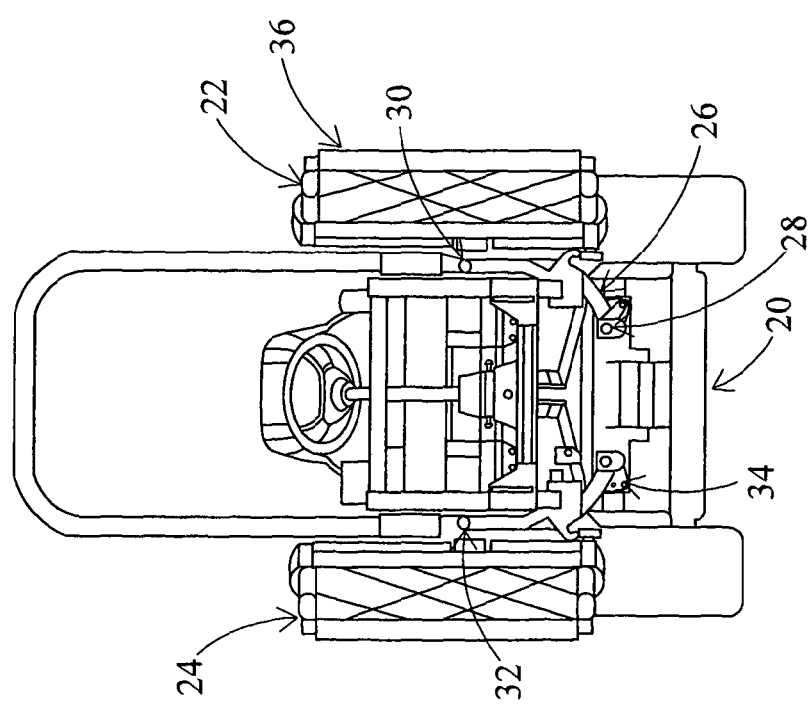
FIG. 2 is a front view of the machine shown in FIG. 1.

FIGS. 1 and 2 show the cutting units in a transport position. Each lift arm (26) has been lifted to the maximum extent by extension of the corresponding ram. In this transport position, the left and right cutting units are locked in a vertical orientation and the overall width of the machine has been significantly reduced.

An inclinometer (38) is mounted on the chassis, conveniently at a location beneath the operator seat unit (18). This provides an input to the control system of the machine, this input providing a value of the forward-and-backward inclination (that is to say the left-right horizontal direction in FIG. 1) and the side-to-side inclination (that is to say the left-right horizontal direction in FIG. 2). The inclinometer (38) may take the form of a commercially available accelerometer having digital outputs.

The manner in which the control system of the machine utilises these incline values will now be described.

FIG. 3 shows a machine positioned on a left to right incline of 22° to the horizontal. The machine is shown with the cutting unit that is lower on the slope, raised into the transport position. The central cutting unit and the cutting unit which is upper on the slope are both in the grass cutting position, that is to say with the roller of each of those two units in ground contact and the unit floating with respect to the chassis. This orientation is chosen as an illustration because it poses a greater risk to stability than the orientation in which all three cutting units are in the cutting position. This orientation with one cutting reel in the transport position may occur, for example, where grass is being cut on an incline adjacent a path or other obstacle. Whilst this orientation has been chosen as an illustration, it will be understood that a risk to stability would occur in other orientations.

In the position shown in FIG. 3, the centre of gravity of the machine (which is shown at 40 in the figure) is displaced from the machine's centre line by virtue of the illustrated orientation of the cutting units. That is to say the cutting reel in the transport position has its weight borne by the chassis and contributes a turning moment. In contrast, the two cutting units which are in the grass cutting position have their weight essentially borne by the respective ground rollers and thus contribute effectively no turning moment. A vertical line is shown in FIG. 3 which represents the outer edge of the ground engagement of the forward wheel (14), this being the edge about which any toppling would occur. It will be understood that as shown in FIG. 3, the machine will loose stability and topple if the centre of gravity shown at (40) moves to the left (in the figure) of the vertical line (42).

In accordance with this invention, detection of an inclination in the left-right direction which is in excess of a predetermined threshold (in this example 22°) results in a lifting movement of the cutting unit which is at the higher level with respect to the slope. This lifting movement is not intended to bring the cutting unit to the transport position but is sufficient to lift both ends of the ground roller of the unit clear of the ground. The weight of the lifted cutting unit is then taken on the chassis and a turning moment is applied. The centre of gravity of the machine is shifted to the position (44) shown in FIG. 4. With the cutting unit normally floating with respect to the chassis, it is advantageous to control this lifting by pulsing the corresponding hydraulic ram, that is to say by introducing a defined amount of hydraulic fluid into that ram. That defined amount of hydraulic fluid should be sufficient, with the geometry shown in FIG. 4, to lift the right hand end of the ground engaging roller (36) from all ground contact.

Figure 5:
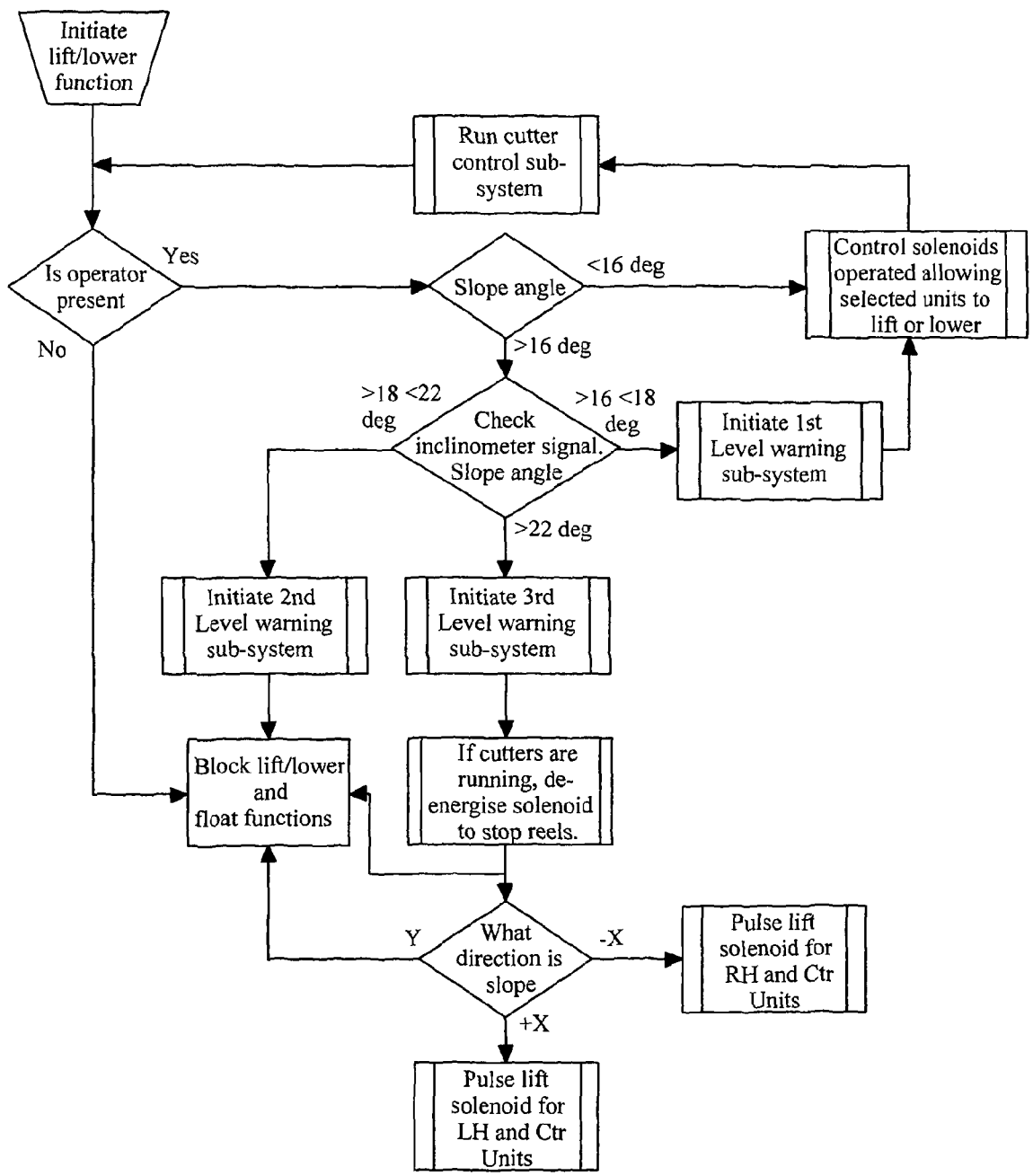
FIG. 5 is a flow diagram illustrating control of the machine in accordance with an example of the invention.

A flow diagram for a preferred control process is shown in FIG. 5.

It will be seen that before any lift/lower function is initiated, checks are made first to determine whether an operator is present and second to determine whether a measured slope angle is less than a first threshold which in this case is 16°. For convenience, the same threshold is applied to the slope measured front and back and to the slope measured left and right. It may in some cases be useful to have separate threshold values. One way to pre-determine this first threshold value is to measure the actual stability of the machine, that is to say to measure the maximum angle of an incline that can be encountered before stability is lost. The first threshold may be chosen to be a proportion, for example approximately 50%, of the maximum stability angle.

If an operator is present and if the measured slope of angle is less than the first threshold of in this case 16°, control solenoids are operated allowing selected units to lift or lower and the run cutter control system is allowed to drive the cutting reels conventionally.

If a slope angle is detected in excess of the first threshold value, a determination is made of whether action is required at a first, second or third level. In a preferred example, the angles associated with the first, second and third levels are:—

| Measured inclination | % of maximum stability angle | Level |
|---|---|---|
| Up to 15° | Up to 50% | |
| Greater than or equal to 16° | | First |
| Greater than or equal to 18° | | Second |
| Greater than or equal to 22° | Over 70% | Third |

At the first level, a warning sub-system is initiated but operation otherwise proceeds as before. The first level warning sub-system might include a display with real-time slope reading, with a selected colour or temporal variation of the display or an appropriate icon.

At the second level, a second level warning sub-system is initiated; this may comprise a different colour or a different temporal variation of the visual display and may further include an appropriate audible alarm. Also, lift, lower and float functions of all three cutter units are blocked. It will be observed that this blocking is the same blocking that occurs in the event of an operator not being present.

At the third level, a third level warning sub-system is initiated in which visual and/or audible alarms are varied to convey still greater urgency to the operator. Also, any of the cutters which are running are stopped. Lift, lower and float functions continue to be blocked. A determination is then made as to the sense of any slope in the left right direction, shown in FIG. 5 as +X or −X. This determination of the sense of the incline enables the upper of the left and right cutting units to be determined so that, as shown in FIG. 4, the hydraulic ram associated with the upper cutting unit can pulsed to lift that upper cutting unit from the ground. Advantageously, the centre unit is also lifted so that the weight of the unit is borne by the chassis, again providing a moment which tends to improve stability.

In appropriate cases, the position of each lift arm may be monitored as the associated cutting unit floats. Then, the hydraulic ram associated with the upper cutting unit can be controlled to rotate the lift arm by that precise minimum amount necessary to lift the cutting unit wholly from the ground. In another arrangement, a similar degree of precision can be obtained by monitoring the proportion of the weight of each cutting unit borne by the chassis, for example with strain gauges.

In certain embodiments, decisions on whether to lift particular units will be taken in dependence upon the measured value of both the left/right and the fore/aft inclinations. On ground having a substantial slope in both directions, it may for example to lift only the centre unit or only the higher forward unit, if the previously described lifting of both the centre and the higher forward unit would not improve fore/aft stability.

In large machines, there may be five or more cutting units and the invention may be employed to lift the central and either the two left or the two right units, as appropriate.

Where a machine has other parameters controlled in dependence upon a measured slope—for example limit of ground speed on a down incline—the above described control processes can be integrated.

Whilst the invention has been described in relation to grass cutting machines, it will be understood to have application to other machines with ground working units, where similar stability considerations apply.

The invention claimed is:

1. A machine comprising:
   a chassis having ground engaging wheels, the chassis structured and operable to be driven in a forward direction;
   at least two ground working units mounted at an outward end of a respective at least one lift arm, each lift arm rotationally mounted at an inward end to the chassis such that the working units are mounted at locations spaced in a first direction transverse to said forward direction, each working unit having a ground engaging element and being liftable, via the respective lift arm, with respect to the chassis from a working position in which the respective ground engaging element is in ground contact;
   an inclinometer structured and operable to monitor an inclination of the chassis in the first direction, transverse to the forward direction, with respect to the horizontal; and
   a controller structured and operable to:
      receive an inclination value from the inclinometer, and
      instruct the respective lift arm to lift that one of the working units that is by virtue of the inclination at a higher level than the other of the working units, when the inclination value exceed a defined threshold.

2. The machine according to claim 1, wherein the controller is configured to lifting a working unit from a working position in which a substantial proportion of the weight of the working unit is borne by the ground, to a lifted position in which a substantial proportion of the weight of the working unit is borne by the chassis.

3. The machine according to claim 1, wherein each working unit is mounted on the respective lift arm extending in the first direction, each lift arm being rotatable with respect to the chassis about an axis extending in the forward direction.

4. A machine comprising:
   a chassis having ground engaging wheels,
      at least two ground working units mounted on the chassis at locations spaced in a first direction, each working unit having a ground engaging element and being liftable with respect to the chassis from a working position in which the respective ground engaging element is in ground contact;
      an inclinometer structured and operable to monitor an inclination of the chassis in the first direction with respect to the horizontal; and
      a controller structured and operable to receive an inclination value from the inclinometer and configured when the inclination value exceeds a defined threshold to lift that one of the working units that is by virtue of the inclination at a higher level than the other of the working units;

wherein each working unit is mounted on a lift arm extending in the first direction, the lift arm being rotatable with respect to the chassis about an axis extending in the forward direction; and wherein the lift arm is rotatable with respect to the chassis from a working position in which the working unit is essentially horizontal to a transport position in which the working unit is essentially vertical, the controller being configured when the inclination value exceeds a defined threshold to rotate the lift arm of that one of the working units to a stability lift position intermediate the working and transport positions.

5. The machine according to claim 4, wherein the moment exerted on the chassis by the working unit is greater in the stability lift position than in the transport position.

6. The machine according to claim 1, wherein the working units comprise grass cutting units.

7. The machine according to claim 6, wherein each grass cutting unit comprises a driven cutter reel cooperating with a fixed blade.

8. The machine according to claim 1, wherein the machine has a measured stability angle being the maximum inclination of the chassis in the first direction with respect to the horizontal at which the machine remains stable, said defined threshold being in the range of 60% to 90% of the measured stability angle.

9. A method of operating a machine, the machine comprising a chassis having ground engaging wheels; at least two ground working units mounted at an outward end of a respective at least one lift arm, each lift arm rotationally mounted at an inward end to the chassis such that the working units are mounted at locations spaced in a first direction transverse to a direction of forward motion of the machine, and being liftable, via the respective lift arm, with respect to the chassis from a working position; said method comprising:

measuring an inclination of the chassis in the first direction, transverse to the forward direction, with respect to the horizontal; and in dependence upon the measured inclination lifting, via the respective lift arm, one only of the at least two working units from a working position in which a substantial proportion of the weight of the working unit is borne by the ground, to a stability lift position in which a substantial proportion of the weight of the working unit is borne by the chassis to improve the stability of the chassis with regard to the inclination in the first direction.

10. The method according to claim 9, wherein lifting only one of the at least two working units comprises lifting the working unit, via the respective lift arm, from the stability lift position to a transport position, the stability lift position being selected such that the moment exerted on the chassis by the working unit is greater in the stability lift position than in the transport position.

11. The method according to claim 9, comprising the step of comparing the measured inclination with a predetermined inclination threshold.

12. The method according to claim 11, further comprising the step of comparing the measured inclination with a plurality of inclination thresholds and providing distinct visual or audible warnings at each threshold.

13. The machine according to claim 1, wherein the machine has a measured stability angle being the maximum inclination of the chassis in the first direction with respect to the horizontal at which the machine remains stable, said defined threshold being in the range of 70% to 80% of the measured stability angle.

* * * * *